US012639855B2

(12) United States Patent
Chen et al.

(10) Patent No.: US 12,639,855 B2
(45) Date of Patent: May 26, 2026

(54) METHOD AND SYSTEM FOR AUTOMATICALLY ACQUIRING TARGET INFORMATION

(71) Applicant: SOLOMON TECHNOLOGY CORPORATION, Taipei City (TW)

(72) Inventors: Cheng-Lung Chen, Taipei City (TW); Xuan Loc Nguyen, Taipei City (TW); Ren-Jie Chen, Taipei City (TW); Chia-Yun Lee, Taipei City (TW); Yu-Yen Liu, Taipei City (TW)

(73) Assignee: SOLOMON TECHNOLOGY CORPORATION, Taipei City (TW)

( * ) Notice: Subject to any disclaimer, the term of this patent is extended or adjusted under 35 U.S.C. 154(b) by 0 days.

(21) Appl. No.: 18/781,664

(22) Filed: Jul. 23, 2024

(65) Prior Publication Data

US 2025/0315979 A1      Oct. 9, 2025

(30) Foreign Application Priority Data

Apr. 3, 2024    (TW) .................................. 113112669

(51) Int. Cl.
 *G06T 7/80* (2017.01)
 *G06V 30/10* (2022.01)
 (Continued)

(52) U.S. Cl.
 CPC ................ *G06T 7/80* (2017.01); *G06V 30/10* (2022.01); *H04N 23/67* (2023.01); *H04N 23/69* (2023.01)

(58) Field of Classification Search
 CPC .......... G06T 7/80; G06V 30/10; H04N 23/69; H04N 23/06
 See application file for complete search history.

(56) References Cited

U.S. PATENT DOCUMENTS

| 2021/0311476 A1 | 10/2021 | Li et al. |
| 2022/0300000 A1 | 9/2022 | Poluboiarinov |

(Continued)

FOREIGN PATENT DOCUMENTS

| CN | 113814992 A | 12/2021 |
| CN | 117765436 A | 3/2024 |

(Continued)

OTHER PUBLICATIONS

Search Report issued to European counterpart application No. 24193060.1 by the EPO on Jan. 24, 2025.

(Continued)

*Primary Examiner* — Yassin Alata
(74) *Attorney, Agent, or Firm* — HSML P.C.

(57) ABSTRACT

A method for automatically acquiring target information, the method is to be implemented by a system that includes a control device and a mobile camera device. The mobile camera device includes a camera having a lens. The method includes: the control device controlling the mobile camera device to move to an actual location in a space, and controlling the mobile camera device to capture and transmit an initial image to the control device; the control device generating a calibration instruction based on a discrepancy between the initial image and a reference image, and transmitting the calibration instruction, a target position data set and a shot magnification ratio to the mobile camera device; the mobile camera device calibrating a shooting angle of the camera, and adjusting a focal length of the lens; and the camera capturing and transmitting a target image to the control device.

20 Claims, 9 Drawing Sheets

(51) Int. Cl.
  H04N 23/67        (2023.01)
  H04N 23/69        (2023.01)

(56)                References Cited

U.S. PATENT DOCUMENTS

| | | | |
|---|---|---|---|
| 2023/0381970 | A1 | 11/2023 | Khansari Zadeh et al. |
| 2023/0384795 | A1 | 11/2023 | Karapetyan et al. |
| 2024/0022806 | A1* | 1/2024 | Kudo .................. H04N 23/695 |

FOREIGN PATENT DOCUMENTS

| | | |
|---|---|---|
| TW | 201636959 A | 10/2016 |
| TW | I656421 B | 4/2019 |
| TW | 202026946 A | 7/2020 |

OTHER PUBLICATIONS

Search Report appended to an Office Action, which was issued to Taiwanese counterpart application No. 113112669 by the TIPO on Nov. 1, 2024, with an English translation thereof (2 pages).

* cited by examiner

Figure 1:
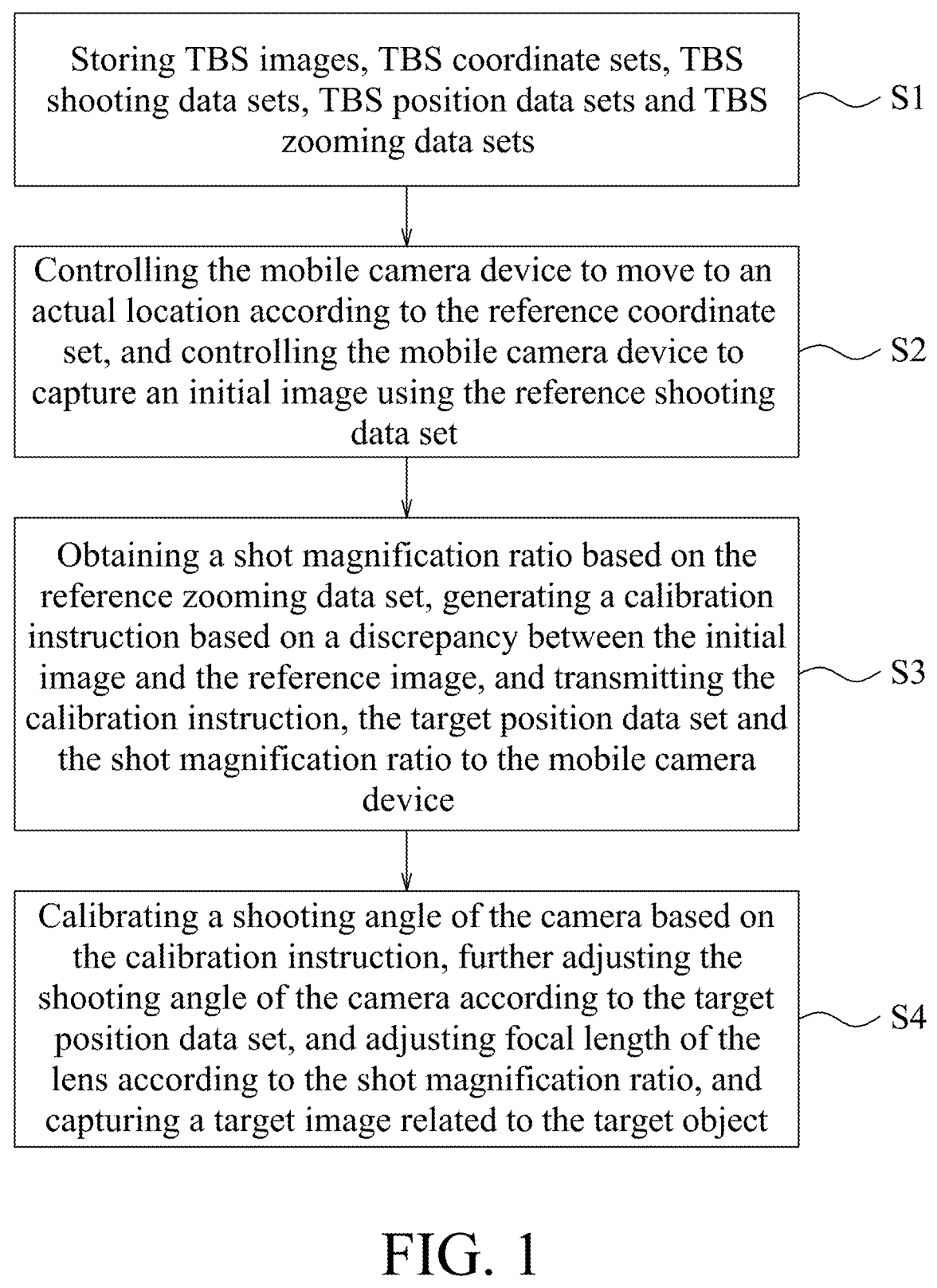

Storing TBS images, TBS coordinate sets, TBS shooting data sets, TBS position data sets and TBS zooming data sets ~ S1

Controlling the mobile camera device to move to an actual location according to the reference coordinate set, and controlling the mobile camera device to capture an initial image using the reference shooting data set ~ S2

Obtaining a shot magnification ratio based on the reference zooming data set, generating a calibration instruction based on a discrepancy between the initial image and the reference image, and transmitting the calibration instruction, the target position data set and the shot magnification ratio to the mobile camera device ~ S3

Calibrating a shooting angle of the camera based on the calibration instruction, further adjusting the shooting angle of the camera according to the target position data set, and adjusting focal length of the lens according to the shot magnification ratio, and capturing a target image related to the target object ~ S4

METHOD AND SYSTEM FOR AUTOMATICALLY ACQUIRING TARGET INFORMATION

CROSS-REFERENCE TO RELATED APPLICATION

This application claims priority to Taiwanese Invention patent application Ser. No. 11/311,2669, filed on Apr. 3, 2024, the entire disclosure of which is incorporated by reference herein.

FIELD

The disclosure relates to a method and a system for automatically acquiring target information.

BACKGROUND

Generally, in order to monitor operating status of equipment installed in a factory and/or acquire environmental information of the factory in real time, various detecting or measuring meters with different functions are set up in the equipment and/or the factory, and personnel are sent to each meter regularly to read and collect measurement data from the meter. However, the aforementioned way of collecting data from various meters not only requires additional manpower, but also requires additional management tasks, and is prone to human error such as misreading or omitting some of the meters.

SUMMARY

Therefore, an object of the disclosure is to provide a method and a system for automatically acquiring target information that can alleviate at least one of the drawbacks of the prior art.

According to an aspect of the disclosure, the method for automatically acquiring target information is to be implemented by a system that includes a control device and a mobile camera device. The mobile camera device includes a camera that is a pan-tilt-zoom (PTZ) camera and that has a lens. The control device stores a reference image, and a reference coordinate set, a reference shooting data set, a target position data set and a reference zooming data set that are related to the reference image. The reference coordinate set corresponds to an actual location in a space, the reference image is captured by the mobile camera device at the actual location using the reference shooting data set, the target position data set is position data related to a position of a partial image of the reference image within the reference image, the partial image corresponds to a target object in the space, and the reference zooming data set is related to the partial image. The method includes: the control device controlling the mobile camera device to move to the actual location in the space according to the reference coordinate set, and controlling the mobile camera device to capture an initial image using the reference shooting data set and to transmit the initial image to the control device; the control device obtaining a shot magnification ratio based on the reference zooming data set; in response to receipt of the initial image, the control device generating a calibration instruction based on a discrepancy between the initial image and the reference image, and transmitting the calibration instruction, the target position data set and the shot magnification ratio to the mobile camera device; in response to receipt of the calibration instruction, the target position data set and the shot magnification ratio, the mobile camera device calibrating a shooting angle of the camera of the mobile camera device based on the calibration instruction, further adjusting the shooting angle of the camera according to the target position data set, and adjusting a focal length of the lens according to the shot magnification ratio; and after adjusting the shooting angle and the focal length, the camera of the mobile camera device capturing a target image that is related to the target object at the actual location, and transmitting the target image to the control device.

According to another aspect of this disclosure, the system for automatically acquiring target information includes a control device and a mobile camera device. The control device stores a reference image, and a reference coordinate set, a reference shooting data set, a target positioning data set and a reference zooming data set that are related to the reference image. The reference coordinate set corresponds to an actual location in a space, the reference image is captured by the mobile camera device at the actual location using the reference shooting data set, the target positioning data set is position data related to a partial image of the reference image within the reference image, the partial image corresponds to a target object in the space, and the reference zooming data set is related to the partial image. The mobile camera device is electrically coupled with and controlled by the control device. The mobile camera device includes a camera that has a lens. The control device is further configured to control the mobile camera device to move to the actual location in the space according to the reference coordinate set, and to control the mobile camera device to capture an initial image using the reference shooting data set and to transmit the initial image to the control device. The control device is further configured to obtain a shot magnification ratio based on the reference zooming data set. The control device is further configured to, in response to receipt of the initial image, generate a calibration instruction based on a discrepancy between the initial image and the reference image, and transmit the calibration instruction, the target positioning data set and the shot magnification ratio to the mobile camera device. The mobile camera device is configured to, in response to receipt of the calibration instruction, the target positioning data set and the shot magnification ratio, calibrate a shooting angle of the camera of the mobile camera device based on the calibration instruction, further adjust the shooting angle of the camera according to the target position data set, and adjust a focal length of the lens according to the shot magnification ratio. After adjusting the shooting angle and the focal length, the camera of the mobile camera device is further configured to capture a target image that is related to the target object at the actual location, and to transmit the target image to the control device.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 1 is a flow chart of a method for automatically acquiring target information according to a first embodiment of this disclosure.

DETAILED DESCRIPTION

Figure 2:
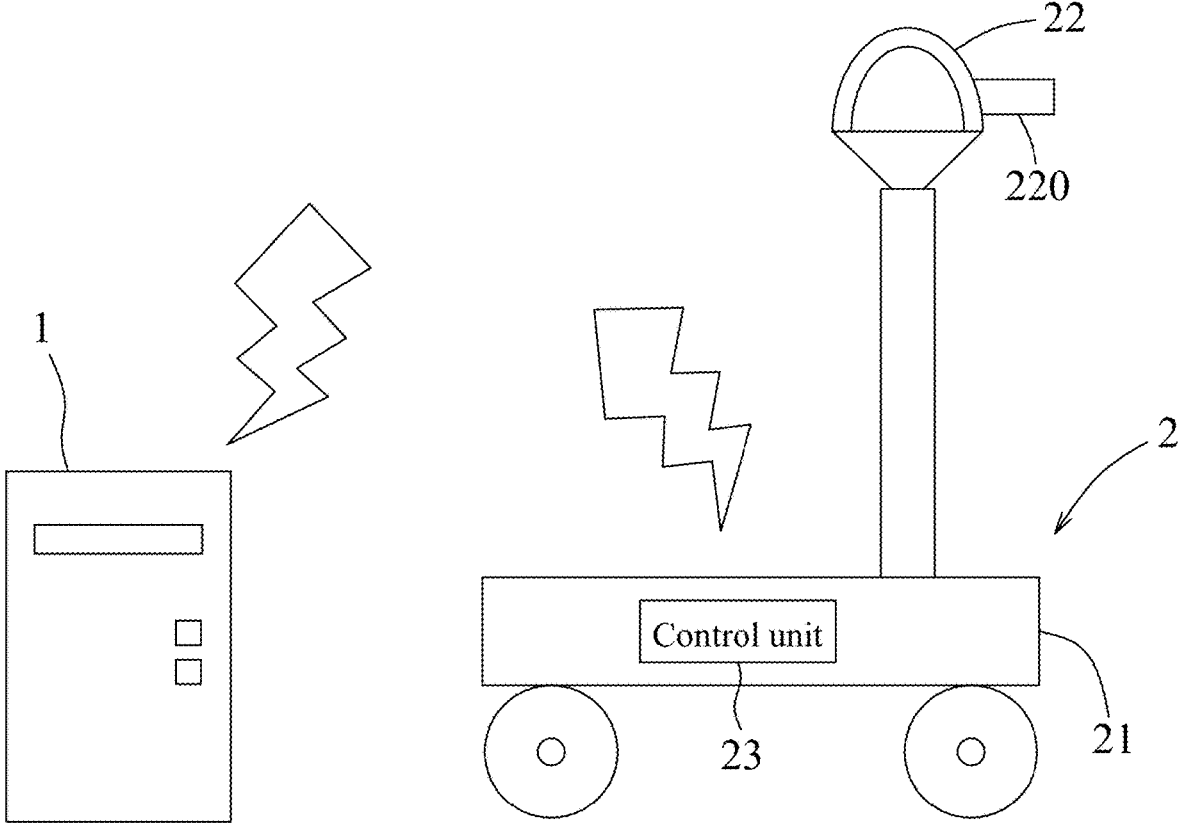
FIG. 2 is a schematic view of a system for automatically acquiring target information according to an embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical or more apparatus/devices/equipment via another one apparatus/devices/equipment, or wireless communication.

Referring to FIG. 1, a flow chart illustrating a first embodiment of a method for automatically acquiring target information according to this disclosure is presented. The method is to be implemented by a system shown in FIG. 2 for automatically acquiring target information. The system includes a control device 1, and a mobile camera device 2 that is electrically coupled with and controlled by the control device 1. For example, the control device 1 is a server that may be embodied as a computer. The mobile camera device 2 includes a mobile body 21, a camera 22 that is disposed on the mobile body 21 and that has a lens 220, and a control unit 23 for controlling the mobile body 21 and the camera 22. The mobile body 21 may use a mechanism/structure of a mobile robot, such as an automated guided vehicle (AGV), a sweeping robot, a vacuum cleaner, a food delivery robot, a drone or a humanoid robot, or a mobile robot for achieving automatic meter reading (AMR). In this embodiment, the camera 22 is embodied using a pan-tilt-zoom (PTZ) camera capable of swiveling horizontally for panning, tilting vertically for adjusting a shooting angle in an up-down direction, and zooming for magnification purpose. However, the camera 22 is not limited to such. In other embodiments, a camera that only has the capabilities of panning and zooming, or a camera that has the capabilities of tilting and zooming may also be used as the camera 22. The control unit 23 is configured to, in response to receipt of data from the control device 1, control operations of the mobile body 21 and the camera 22 based on the data received from the control device 1.

The control unit 23 may include, but is not limited to, at least one of, a multi-core processor, a microprocessor, a digital signal processor (DSP), a field programmable gate array (FPGA), an application special integrated circuit (ASIC) and a radio frequency integrated circuit (RFIC).

In this embodiment, the control device 1 is configured to wirelessly communicate with the mobile camera device 2 via wireless communication technique such as Wi-Fi®, Bluetooth®, and ZigBee®. In some embodiments, the control device 1 may be electrically connected to and integrated with the mobile camera device 2 directly, where in such embodiments, the control device 1 is disposed on the mobile camera device 2 so as to move along with the mobile camera device 2.

Referring to FIG. 1, the method includes steps S1 to S4 according to the first embodiment. In step S1, the control device 1 stores a plurality of to-be-selected (TBS) images, a plurality of TBS coordinate sets, a plurality of TBS shooting data sets, a plurality of TBS position data sets, and a plurality of TBS zooming data sets. Each of the TBS images has at least one target object therein. For each of the TBS images, a respective one of the TBS coordinate sets and a respective one of the TBS shooting data sets are related to the TBS image, and a respective one of the TBS position data sets and a respective one of the TBS zooming data sets are related to the target object in the TBS image. It should be noted that the control device 1 may store the above-mentioned data prior to implementing the method.

Each of the TBS coordinate sets corresponds to an actual location in a space (e.g., a factory). In this embodiment, the control device 1 further stores a digital map of the space, and the digital map includes a plurality of TBS checkpoints corresponding respectively to various actual locations in the space. Each of the TBS coordinate sets is a coordinate set of a respective one of the TBS checkpoints in the digital map.

Figure 3:
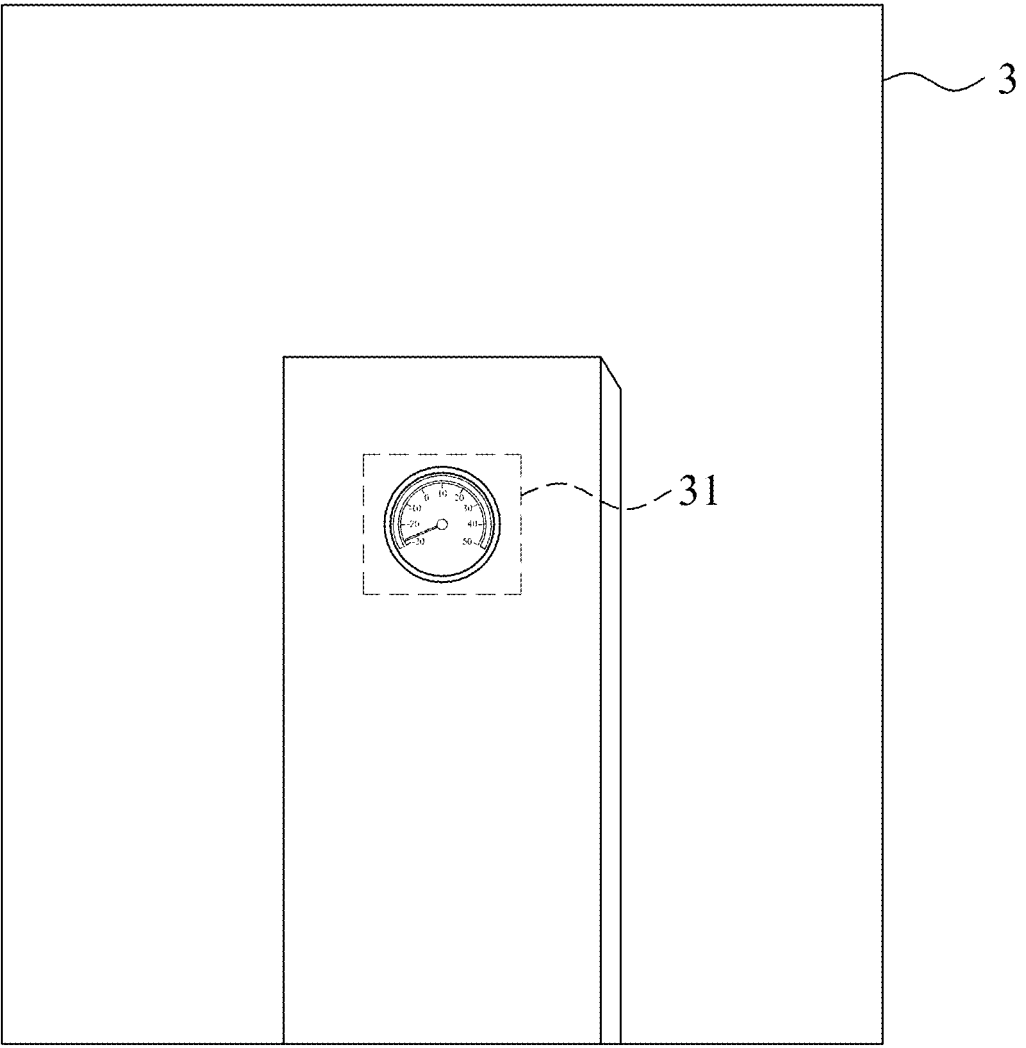
FIG. 3 shows a reference image to be used as a standard in the method for automatically acquiring target information.

Referring to FIG. 3, an example of one of the TBS images 3 is shown. Each of the TBS images is captured in advance by the mobile camera device 2 at the corresponding actual location in the space. For each of the TBS images, the mobile camera device 2 uses the camera 22 and the TBS shooting data set that corresponds to the TBS image to capture the TBS image. In this embodiment, each of the TBS shooting data sets includes, but is not limited to, three parameter values (i.e., a panning angle, a tilting angle, and a zooming value (i.e., a magnification ratio)) respectively for controlling the panning, tilting and zooming of the camera 22. The digital map may be, generated by the mobile camera device 2 in advance, for example, by applying a conventional method of constructing an environmental map using a mobile robot with vision; however, the disclosure is not limited to thus.

Each of the TBS position data set is position data related to a position of a partial image of the corresponding one of the TBS images. The partial image corresponds to a target object in the space (i.e., an image of the target object). For example, each of the TBS position data sets may be location coordinates of a center of the partial image. Each of the TBS zooming data sets is related to a magnification ratio of the partial image. For example, the target object is exemplified as a meter (e.g., a water meter, an electric meter, a pressure meter, a thermometer, a humidity meter, etc., and not limited to such). In the example of the TBS image 3 shown in FIG. 3, a partial image 31 is an image of the target object which is a meter.

The control device 1 is configured to first display the digital map through a display (not shown) and allows an operator to select one of the TBS checkpoints in the digital map as a current checkpoint. Then, the control device 1, in response to the selection of the current checkpoint from among the TBS checkpoints, selects one of the TBS images that corresponds to the current checkpoint as a reference image (e.g., the reference image 3 shown in FIG. 3), selects one of the TBS coordinate sets that corresponds to the reference image as a reference coordinate set, selects one of the TBS shooting data sets that corresponds to the reference image as a reference shooting data set, selects one of the TBS position data sets that corresponds to the reference image as a target position data set, and selects one of the TBS zooming data sets that corresponds to the reference image as a reference zooming data set.

Figure 4:
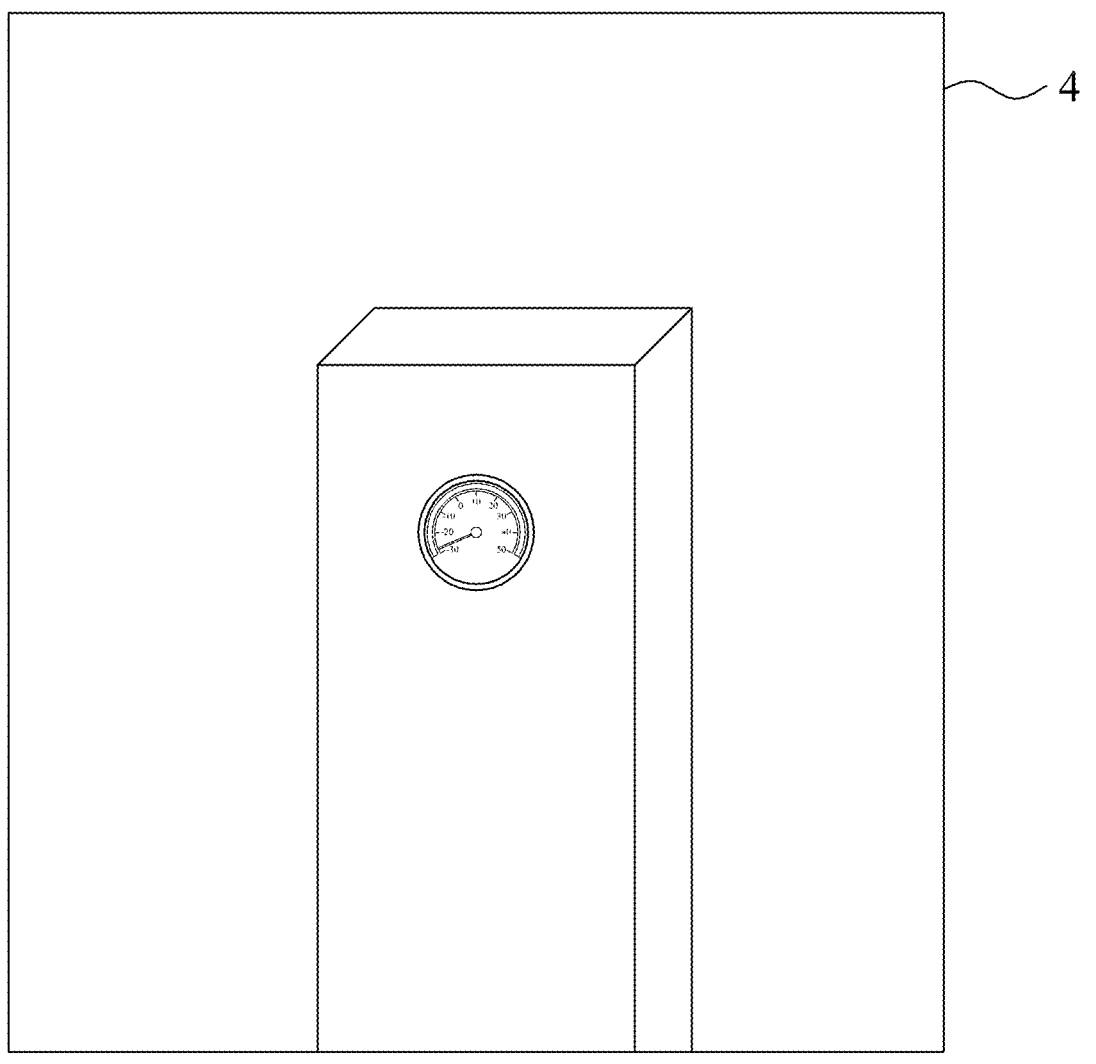
FIG. 4 shows an initial image initially captured by a mobile camera device of the system for automatically acquiring target information.

Then, in step S2, the control device 1 then controls the mobile camera device 2 to move to one of the actual locations in the space according to the reference coordinate set, and controls the camera 22 of the mobile camera device 2 to capture an initial image 4 (as shown in FIG. 4) using the reference shooting data set and to transmit the initial image 4 to the control device 1. That is to say, in response to receipt of the data from the control device 1 (i.e., the reference coordinate set), the control unit 23 controls the mobile body 21 to move the mobile camera device 2 based on the data received from the control device 1

In step S3, in response to receipt of the initial image 4, the control device 1 determines a discrepancy between the initial image 4 and the reference image 3. For example, comparing FIG. 3 (i.e., the reference image 3) and FIG. 4 (i.e., the initial image 4), it can be seen that the initial image 4 is not taken from a shooting angle that is the same as the shooting angle in which the reference image 3 was taken. This difference in shooting angle may result from errors in mechanism or movement of the camera 22 each time the camera 22 adjusts its shooting angle according to the reference shooting data set, even though the mobile camera device 2 uses the same reference shooting data set used to capture the reference image 3 to capture the initial image 4 at the same actual location according to the same reference coordinate set. If the discrepancy is not calibrated immediately, it is likely that the camera 22 will not be able to capture the target object (i.e., the meter) accurately and an image thus captured may not clearly include the target object. In this embodiment, the control device 1 uses a method disclosed in Taiwanese Patent No. 1834495 to calculate the discrepancy between the shooting angle of the initial image 4 and that of the reference image 3.

The control device 1 then generates a calibration instruction based on the discrepancy (i.e., the difference in shooting angles) between the initial image 4 and the reference image 3. The control device 1 obtains a shot magnification ratio based on the reference zooming data set. The control device 1 then transmits the calibration instruction, the target position data set, and the shot magnification ratio to the mobile camera device 2. In this embodiment, the reference zooming data set includes the shot magnification ratio. In some embodiments, the reference zooming data set may include region data related to a region of the partial image 31 (e.g., the region as marked by dotted lines in FIG. 3). The region data may include an area of the partial image 31, or the region data may include a perimeter of the partial image 31. The control device 1 obtains the shot magnification ratio by calculating the shot magnification ratio based on the region data. For example, the shot magnification ratio may be obtained by calculating a ratio between the area of the partial image 31 and an area of the reference image 3, or by calculating a ratio between the length or width of the perimeter of the partial image 31 of the reference image 3 and the length or width of the perimeter of the reference image 3. It should be noted that the control device 1 may calculate the shot magnification ratio and store the same prior to implementing the method.

Figure 5:
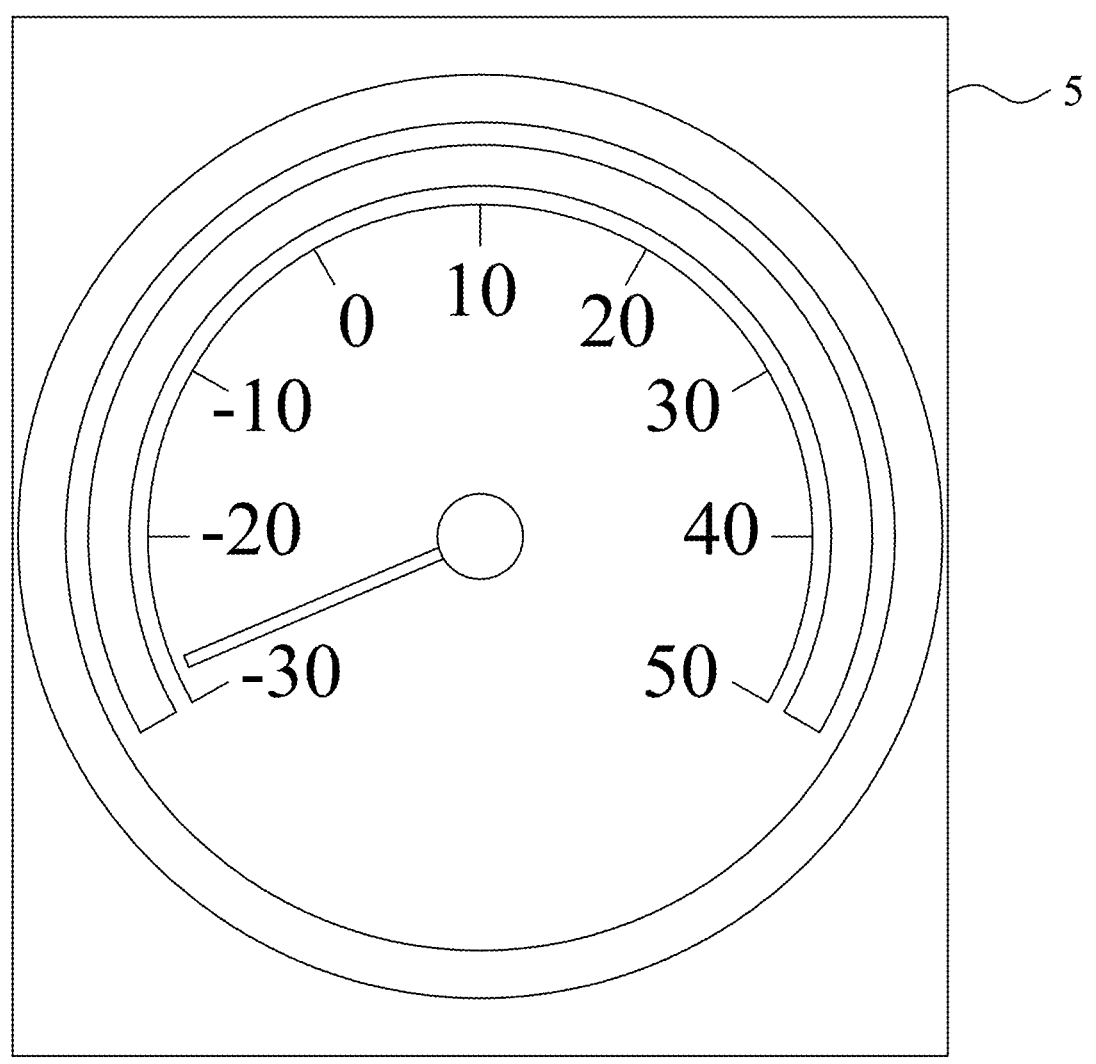
FIG. 5 shows a target image captured by the mobile camera device that has been adjusted according to the initial image.

In step S4, in response to receipt of the data from the control device 1 (i.e., the calibration instruction, the target position data set and the shot magnification ratio), the mobile camera device 2 calibrates the shooting angle of the camera 22 based on the calibration instruction. Specifically, the control unit 23 of the mobile camera device 2, in response to receipt of the calibration instruction, adjusts the panning and/or tilting angle of the camera 22 so that the camera 22 may capture an image from a shooting angle that is the same or substantially the same as the reference image 3. Then, the control unit 23 of the mobile camera device 2 further adjusts the shooting angle of the camera 22 according to the target position data set in order to make the lens 220 aim at the target object, and adjusts a focal length of the lens 220 according to the shot magnification ratio. In this embodiment, the shot magnification ratio is exemplified as 6. After adjusting the shooting angle and the focal length, the PTZ camera 22 of the mobile camera device 2 captures a target image 5 (see FIG. 5) that is related to the target object at the actual location, and transmits the target image 5 to the control device 1. With the abovementioned steps, the mobile camera device 2 may accurately and clearly capture the target image 5 of the target object.

It should be noted that, in a case that the reference image has another partial image that is related to another target object, the control device 1 will select another one of the TBS position data sets and another one of the TBS zooming data sets that are related to said another target object, and repeats steps S2 to S4 again to obtain another target image for said another target object with said another one of the TBS position data sets and said another one of the TBS zooming data sets as the target position data set and the reference zooming data set, respectively. That is to say, when one of the TBS images has two or more target objects, in order to obtain the target images respectively for the target objects, the same one of the TBS images will be selected as the reference image for all of the target objects.

In response to receipt of the target image 5, the control device 1 may perform image recognition on the target image 5 using technologies including, but not limited to, optical character recognition (OCR) technology and/or artificial intelligence (AI) image recognition technology, to obtain characters from the target image 5. By doing so, the control device 1 may achieve automatic meter reading (AMR) by controlling the mobile camera device 2 to move to the actual location of the target object and obtaining a reading of the target object such as a reading of the meter. Besides that, when the target object is not a meter but is an article to be inspected such as a circuit board or a workpiece, the control device 1 may also use the OCR technology and/or AI image recognition technology to perform inspection in order to detect abnormal condition of the target object presented in the target image 5.

When multiple ones of the TBS checkpoints are selected in the digital map, the control device 1 may control the mobile camera device 2 to perform steps S2 to S4 in FIG. 1 multiple times until multiple target images that correspond respectively to the multiple ones of the TBS checkpoints selected are obtained respectively at the actual locations that correspond respectively to the multiple ones of the TBS checkpoints and the multiple target images are all transmitted to the control device 1, thereby an automatic inspection may be achieved.

Figure 6:
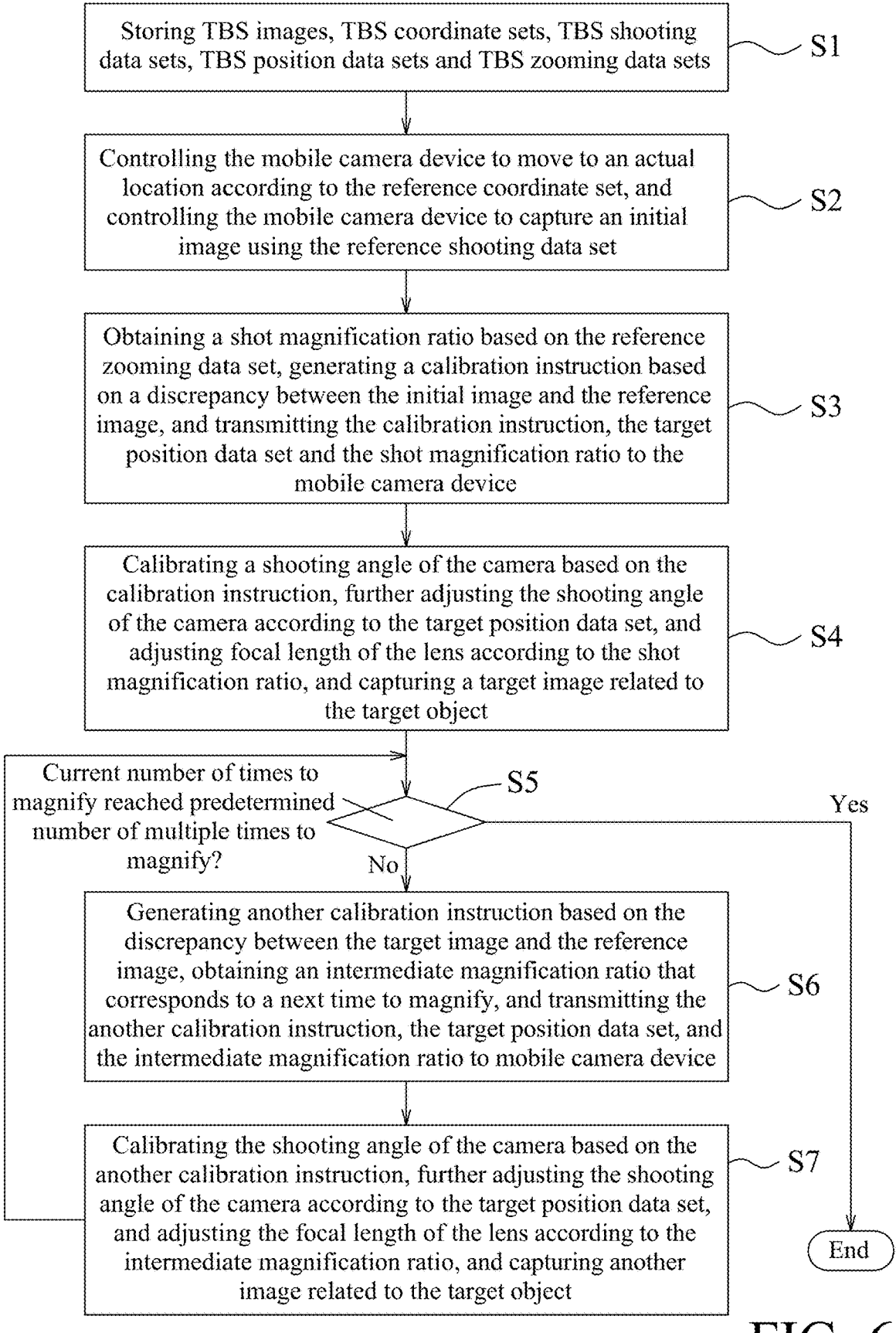
FIG. 6 is a flow chart of the method according to a second embodiment of this disclosure.

Referring to FIG. 6, a flow chart illustrating a second embodiment of the method for automatically acquiring target information according to this disclosure is presented. Steps S1 to S4 of the second embodiment are similar to steps of S1 to S4 of the first embodiment. This embodiment differs from the first embodiment in that the calibration of the shooting angle of the camera 22 and the adjustment of the lens 220 of the camera 22 are done gradually in order to obtain a target image of a target object with a predetermined magnification ratio (e.g., a magnification ratio of 6 times). In step S3 of the second embodiment, the control device 1 generates a calibration instruction (hereinafter referred to as "first calibration instruction") based on a discrepancy between the initial image 4 and the reference image 3.

In order to achieve the abovementioned gradual calibration and adjustment, in the second embodiment, the reference zooming data set includes the predetermined magnification ratio, and the control device 1 calculates the predetermined magnification ratio according to a distance between the target object and the actual location in the space in advance. Based on the predetermined magnification ratio, the control device 1 determines a predetermined number of multiple times to magnify, and a plurality of intermediate magnification ratios respectively for the multiple times to magnify. Specifically, the control device 1 obtains the intermediate magnification ratios in a manner that a product of the intermediate magnification ratios is equal to the predetermined magnification ratio.

For example, the reference zooming data set (i.e., the predetermined magnification ratio) in this embodiment is 6, and the control device 1 may determine the predetermined number of multiple times to magnify to be three times, and the intermediate magnification ratios respectively for the three times to magnify may be, for example, but not limited to, 1.5× for a first time to magnify, 2× for a second time to magnify, and 2× for a third time to magnify. In another example, the intermediate magnification ratios may be 2× for the first time to magnify, 1.5× for the second time to magnify, and 2× for the third time to magnify. In step S3, the control device 1 obtains the shot magnification ratio by selecting one of the intermediate magnification ratios that corresponds to the first time to magnify as the shot magnification ratio (hereinafter referred to as "first shot magnification ratio").

Figure 7:
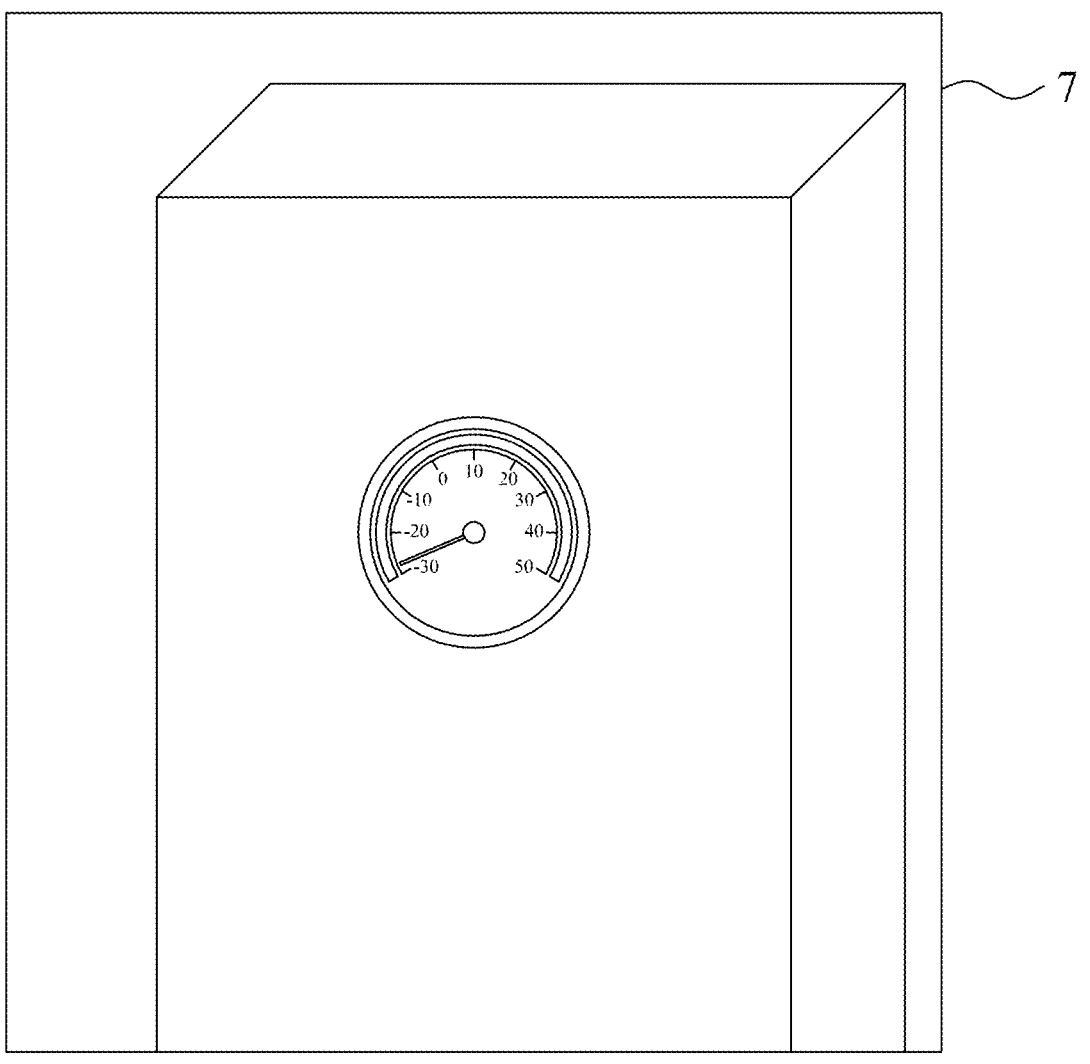
FIG. 7 shows a first target image captured by the mobile camera device.

In step S4, the mobile camera device 2 calibrates the shooting angle of the camera 22 based on the first calibration instruction for a first time in this embodiment. The mobile camera device 2 further adjusts the shooting angle of the camera 22 according to the target position data set, and adjusts the focal length of the lens 220 according to the first shot magnification ratio. Using the intermediate magnification ratios of 1.5× for the first time to magnify, 2× for the second time to magnify, and 2× for the third time to magnify as an example for this embodiment, the first shot magnification ratio is 1.5×. After the shooting angle and the focal length are adjusted, the camera 22 captures a first target image 7 (see FIG. 7) that is related to the target object at the actual location, and the mobile camera device 2 transmits the first target image 7 to the control device 1.

In step S5, in response to the control device 1 receiving the first target image 7, the control device 1 determines whether a current number of times to magnify has reached the predetermined number of the multiple times to magnify (i.e., three times). The flow ends when the determination is affirmative, and goes to S6 when otherwise. Regarding the foregoing circumstance, the current number of times to magnify is one (i.e., first time to magnify), and thus the determination is not affirmative, and the flow goes to step S6.

In step S6, the control device 1 generates another calibration instruction (hereinafter referred to as "second calibration instruction") based on the discrepancy between the first target image 7 and the reference image 3, and obtains one of the intermediate magnification ratios that corresponds to a next time to magnify immediately after a current time to magnify corresponding to the current number. According to the aforementioned example, the one of the intermediate magnification ratios that is obtained by the control device 1 at this time corresponds to the second time to magnify and is 2× (hereinafter referred to as "second shot magnification ratio"). The control device 1 then transmits the second calibration instruction, the target position data set, and the second shot magnification ratio to the mobile camera device 2.

Figure 8:
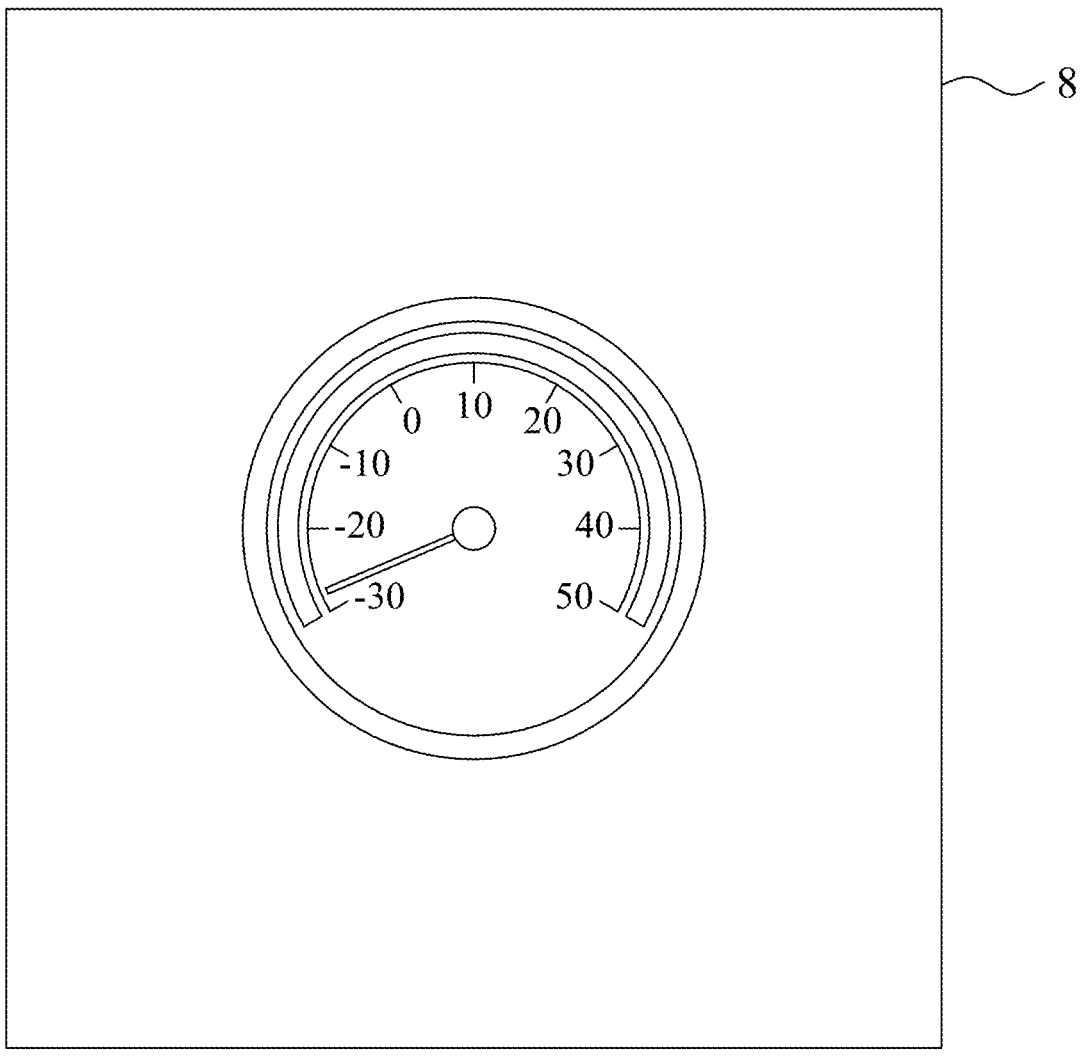
FIG. 8 shows a second target image captured by the mobile camera device.

Then, the flow goes to step S7, in which the mobile camera device 2 calibrates the shooting angle of the camera 22 of the mobile camera device 2 based on the second calibration instruction, further adjusts the shooting angle of the camera 22 according to the target position data set, and adjusts the focal length of the lens 220 according to the second shot magnification ratio. After adjusting the shooting angle and the focal length, the camera 22 of the mobile camera device 2 captures a second target image 8 (see FIG. 8) that is also related to the target object at the actual location, and transmits the second target image 8 to the control device 1.

The flow then goes back to step S5 after step S7. In response to the control device 1 receiving the second target image 8, the control device 1 determines whether the current number of times to magnify (i.e., the second time to magnify) has reached the predetermined number of the multiple times to magnify (i.e., three times). Since the determination is not affirmative, the flow goes to step S6 again, in which the control device 1 generates yet another calibration instruction (hereinafter referred to as "third calibration instruction") based on the discrepancy between the second target image 8 and the reference image 3, and obtains a third one of the intermediate magnification ratios that corresponds the third time to magnify (hereinafter referred to as "third shot magnification ratio"), and transmits the third calibration instruction, the target position data set, and the third shot magnification ratio to the mobile camera device 2.

Figure 9:
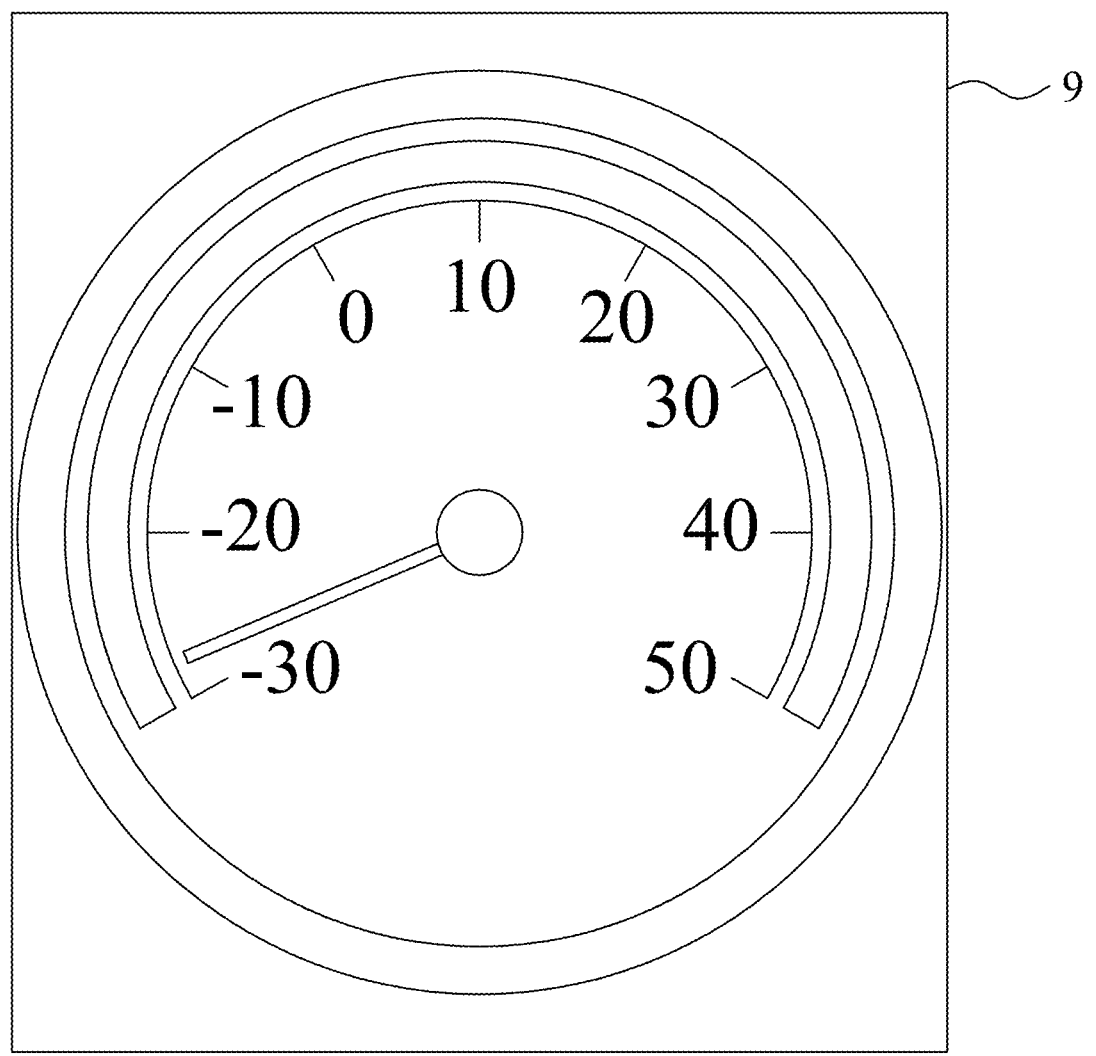
FIG. 9 shows a third target image captured by the mobile camera device.

The flow then goes to step S7 again, in which the mobile camera device 2 calibrates the shooting angle of the camera 22 of the mobile camera device 2 based on the third calibration instruction, further adjusts the shooting angle of the camera 22 according to the target position data set, and adjusts the focal length of the lens 220 according to the third shot magnification ratio (i.e., 2× according to the example mentioned above). After adjusting the shooting angle and the focal length, the camera 22 of the mobile camera device 2 captures a third target image 9 (see FIG. 9) that is also related to the target object at the actual location, and transmits the third target image 9 to the control device 1.

The flow then goes back to step S5, in which the control device 1 determines whether the current number of times to magnify (i.e., the third time to magnify) has reached the predetermined number of the multiple times to magnify (i.e., three times). Since the determination is affirmative at this time, the flow ends. The control device 1 then stores the third target image 9 as a representational image for the target object. In this embodiment, similar to the first embodiment, the control device 1 also uses, but is not limited to, the method disclosed in Taiwanese Patent No. 1834495 to calculate the discrepancy in step S6.

As can be seen from the above described embodiments, the first embodiment and the second embodiment are both able to accurately obtain the target images (i.e., the target image 5 for the first embodiment, and the third target image 9 for the second embodiment) for the target object. The second embodiment uses the method that gradually calibrates shooting angle of the camera 22 and adjusts the focal length of the lens 220 of the camera 22, which enables the third target image 9 to be obtained more accurately.

Similar to the first embodiment, in the second embodiment, when multiple ones of the TBS checkpoints are selected in the digital map, the control device 1 may control the mobile camera device 2 to perform steps in FIG. 6 multiple times until the mobile camera device 2 has obtained correspondingly, the target images (e.g., the third target images) at the actual locations that correspond respectively to the multiple ones of the TBS checkpoints, and transmits the third target images to the control device 1, thereby an automatic inspection may be achieved.

In sum, in the abovementioned embodiments, the control device 1 in the first embodiment generates the calibration instruction based on the discrepancy between the initial image 4 and the reference image 3, or in the second embodiment generates gradually multiple calibration instructions. The shooting angle of the camera 22 is calibrated for one time or gradually, so that the shooting angle of the camera 22 may be as similar to that of the reference image 3 as possible based on the calibration instruction(s). The shooting angle of the camera 22 is further adjusted according to the target position data set, and the focal length of the lens 220 is adjusted one time or gradually according to the shot magnification ratio(s). After adjusting the shooting angle and the focal length for one time or gradually, the camera 22 captures the target image. Therefore, the mobile camera device 2 is able to clearly capture the target image of the target object, which may be used later by the control device 1 to perform image recognition to obtain the characters or to detect abnormal condition of the target object presented. Aside from being able to address the problems of manually reading/recording the meters, the embodiments presented in this disclosure are able to accurately obtain target information (e.g., the reading of the meter of the target object) according to a desired inspection routine. The method as disclosed in this disclosure, in addition to being able to be implemented on AGV, may also be applied to mobile robots such as food delivery robots or humanoid robots in order to achieve the inspection objective of this disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for automatically acquiring target information, the method is to be implemented by a system that includes a control device and a mobile camera device, the mobile camera device including a camera that is a pan-tilt-zoom (PTZ) camera and that has a lens, the control device storing a reference image, and a reference coordinate set, a reference shooting data set, a target position data set and a reference zooming data set that are related to the reference image, the reference coordinate set corresponding to an actual location in a space, the reference image being captured by the mobile camera device at the actual location using the reference shooting data set, the target position data set being position data related to a position of a partial image of the reference image within the reference image, the partial image corresponding to a target object in the space, the reference zooming data set being related to the partial image, the method comprising:

the control device controlling the mobile camera device to move to the actual location in the space according to the reference coordinate set, and controlling the mobile camera device to capture an initial image using the reference shooting data set and to transmit the initial image to the control device;

the control device obtaining a shot magnification ratio based on the reference zooming data set;

in response to receipt of the initial image, the control device generating a calibration instruction based on a discrepancy between the initial image and the reference image, and transmitting the calibration instruction, the target position data set and the shot magnification ratio to the mobile camera device;

in response to receipt of the calibration instruction, the target position data set and the shot magnification ratio, the mobile camera device calibrating a shooting angle of the camera of the mobile camera device based on the calibration instruction so that an image that is captured by the camera at the shooting angle thus calibrated is substantially the same as the reference image, further adjusting the shooting angle of the camera according to the target position data set, and adjusting a focal length of the lens according to the shot magnification ratio; and after adjusting the shooting angle and the focal length, the camera of the mobile camera device capturing a target image that is related to the target object at the actual location, and transmitting the target image to the control device.

2. The method as claimed in claim 1, further comprising:

in response to receipt of the target image, the control device performing image recognition on the target image so as to undertake one of a first action of obtaining characters from the target image, and a second action of detecting abnormal condition of the target object presented in the target image;

wherein performing image recognition on the target image includes using one of an optical character recognition (OCR) technology and an artificial intelligence (AI) image recognition technology to perform image recognition on the target image.

3. The method as claimed in claim 1, wherein the reference zooming data set includes the shot magnification ratio.

4. The method as claimed in claim 1, wherein the reference zooming data set includes region data related to a region of the partial image, and obtaining the shot magnification ratio includes calculating the shot magnification ratio based on the region data.

5. The method as claimed in claim 1, wherein the control device further stores a digital map of the space, the reference coordinate set is a coordinate set of a current checkpoint in the digital map, and the current checkpoint corresponds to the actual location in the space.

6. The method as claimed in claim 5, the digital map including a plurality of to-be-selected (TBS) checkpoints, the control device storing a plurality of TBS coordinate sets corresponding respectively to the TBS checkpoints, a plurality of TBS images corresponding respectively to the TBS coordinate sets, a plurality of TBS shooting data sets corresponding respectively to the TBS images, a plurality of TBS position data sets corresponding respectively to the TBS images, and a plurality of TBS zooming data sets corresponding respectively to the TBS images, the method further comprising, before controlling the mobile camera device to move to the actual location, the control device, in response to a selection of the current checkpoint from among the TBS checkpoints, selecting one of the TBS images that corresponds to the current checkpoint as the reference image, selecting one of the TBS coordinate sets that corresponds to the reference image as the reference coordinate set, selecting one of the TBS shooting data sets that corresponds to the reference image as the reference shooting data set, selecting one of the TBS position data sets that corresponds to the reference image as the target position data set, and selecting one of the TBS zooming data sets that corresponds to the reference image as the reference zooming data set.

7. The method as claimed in claim 1, the control device further storing a predetermined number of multiple times to magnify, and a plurality of intermediate magnification ratios respectively for the multiple times to magnify, the intermediate magnification ratios being calculated based on the reference zooming data set, wherein obtaining the shot magnification ratio includes selecting one of the intermediate magnification ratios that corresponds to first time to magnify as the shot magnification ratio, wherein the method further comprises, in response to the control device receiving the target image and determining that a current number of times to magnify has not reached the predetermined number of the multiple times to magnify, the control device generating another calibration instruction based on the discrepancy between the target image and the reference image, obtaining one of the intermediate magnification ratios that corresponds to a next time to magnify immediately after a current time to magnify corresponding to the current number, and transmitting said another calibration instruction, the target position data set, and said one of the intermediate magnification ratios to the mobile camera device, the mobile camera device calibrating the shooting angle of the camera of the mobile camera device based on said another calibration instruction, further adjusting the shooting angle of the camera according to the target position data set, and adjusting the focal length of the lens according to said one of the intermediate magnification ratios, and after adjusting the shooting angle and the focal length, the camera of the mobile camera device capturing another image that is related to the target object at the actual location, and transmitting said another image to the control device.

8. The method as claimed in claim 7, the reference zooming data set including a predetermined magnification ratio, the method further comprising the control device calculating the predetermined magnification ratio according to a distance between the target object and the actual location in the space, and obtaining the intermediate magnification ratios in a manner that a product of the intermediate magnification ratios is equal to the predetermined magnification ratio.

9. A system for automatically acquiring target information, comprising:

a control device that stores a reference image, and a reference coordinate set, a reference shooting data set, a target positioning data set and a reference zooming data set that are related to the reference image, the reference coordinate set corresponding to an actual location in a space, the reference image being captured by said mobile camera device at the actual location using the reference shooting data set, the target positioning data set being position data related to a position of a partial image of the reference image within the reference image, the partial image corresponding to a target object in the space, and the reference zooming data set being related to the partial image, and a mobile camera device that is electrically coupled with and controlled by said control device, said mobile camera device including a camera that has a lens, wherein said control device is configured to control said mobile camera device to move to the actual location in the space according to the reference coordinate set, and control said mobile camera device to capture an initial image using the reference shooting data set and to transmit the initial image to said control device, obtain a shot magnification ratio based on the reference zooming data set, and in response to receipt of the initial image, generate a calibration instruction based on a discrepancy between the initial image and the reference image, and transmit the calibration instruction, the target positioning data set and the shot magnification ratio to said mobile camera device, wherein said mobile camera device is configured to in response to receipt of the calibration instruction, the target positioning data set and the shot magnification ratio, calibrate a shooting angle of said camera of said mobile camera device based on the calibration instruction so that an image that is captured by said camera at the shooting angle thus calibrated is substantially the same as the reference image, further adjust the shooting angle of said camera according to the target position data set, and adjust a focal length of said lens according to the shot magnification ratio, and

13 after adjusting the shooting angle and the focal length, capture a target image that is related to the target object at the actual location, and transmit the target image to said control device.

10. The system as claimed in claim 9, wherein said control device is further configured to, upon receipt of the target image, perform image recognition on the target image so as to undertake one of a first action of obtaining characters from the target image, and a second action of detecting abnormal condition of the target object presented in the target image, wherein said control device is configured to use one of an optical character recognition (OCR) technology and an artificial intelligence (AI) image recognition technology to perform image recognition on the target image.

11. The system as claimed in claim 9, wherein the reference zooming data set includes the shot magnification ratio.

12. The system as claimed in claim 9, wherein the reference zooming data set includes region data related to a region of the partial image, and said control device is configured to obtain the shot magnification ratio by calculating the shot magnification ratio based on the region data.

13. The system as claimed in claim 9, wherein said control device further stores a digital map of the space, the reference coordinate set is a coordinate set of a current checkpoint in the digital map, and the current checkpoint corresponds to the actual location in the space.

14. The system as claimed in claim 13, wherein the digital map includes a plurality of to-be-selected (TBS) checkpoints, and said control device further stores a plurality of TBS coordinate sets corresponding respectively to the checkpoints, a plurality of TBS images corresponding respectively to the TBS coordinate sets, a plurality of TBS shooting data sets corresponding respectively to the TBS images, a plurality of TBS position data sets corresponding respectively to the TBS images, and a plurality of TBS zooming data sets corresponding respectively to the TBS images, wherein said control device is further configured to, in response to a selection of the current checkpoint from among the TBS checkpoints, and before controlling said mobile camera device to move to the actual location, select one of the TBS images that corresponds to the checkpoint as the reference image, select one of the TBS coordinate sets that corresponds to the reference image as the reference coordinate set, select one of the TBS shooting data sets that corresponds to the reference image as the reference shooting data set, select one of the TBS position data sets that corresponds to the reference image as the target position data set, and select one of the TBS zooming data sets that corresponds to the reference image as the reference zooming data set.

15. The system as claimed in claim 9, wherein said mobile camera device further includes a mobile body, and a control unit for controlling said mobile body and said camera, said camera is disposed on said mobile body, and said control unit is configured to, in response to receipt of data from said control device, control operations of said mobile body and said camera based on the data received from said control device.

16. The system as claimed in claim 15, wherein said mobile body is one of an automated guided vehicle (AGV), a sweeping robot, a vacuum cleaner, a food delivery robot, a drone, a humanoid robot, and a mobile robot for achieving automatic meter reading (AMR).

17. The system as claimed in claim 9, wherein said control device is integrated with said mobile camera device so as to move along with said mobile camera device.

18. The system as claimed in claim 9, wherein said control device further stores a predetermined number of multiple times to magnify, and a plurality of intermediate magnification ratios respectively for the multiple times to magnify, the intermediate magnification ratios being calculated based on the reference zooming data set, wherein said control device is further configured to obtain the shot magnification ratio by selecting one of the intermediate magnification ratios that corresponds to first time to magnify as the shot magnification ratio, wherein, in response to receiving the target image and determining that a current number of times to magnify has not reached the predetermined number of the multiple times to magnify, said control device is further configured to generate another calibration instruction based on the discrepancy between the target image and the reference image, to obtain one of the intermediate magnification ratios that corresponds to a next time to magnify immediately after a current time to magnify corresponding to the current number, and to transmit said another calibration instruction, the target position data set, and said one of the intermediate magnification ratios to said mobile camera device, wherein said mobile camera device is further configured to calibrate the shooting angle of said camera of said mobile camera device based on said another calibration instruction, further adjust the shooting angle of said camera according to the target position data set, and adjust the focal length of said lens according to said one of the intermediate magnification ratios, and after the shooting angle and the focal length are adjusted, capture another image that is related to the target object at the actual location, and transmit said another image to said control device.

19. The system as claimed in claim 18, wherein the reference zooming data set includes a predetermined magnification ratio, wherein said control device is configured to calculate the predetermined magnification ratio according to a distance between the target object and the actual location in the space, and to obtain the intermediate magnification ratios in a manner that a product of the intermediate magnification ratios is equal to the predetermined magnification ratio.

20. The system as claimed in claim 9, wherein said camera is a pan-tilt-zoom (PTZ) camera.

* * * * *